United States Patent [19]

Kasten

[11] 4,154,637
[45] May 15, 1979

[54] METHOD OF MAKING A LANDSCAPE BLANKET

[75] Inventor: Walter Kasten, Franklin, Mich.

[73] Assignee: X Incorporated, Franklin, Mich.

[21] Appl. No.: 847,399

[22] Filed: Oct. 31, 1977

Related U.S. Application Data

[63] Continuation-in-part of Ser. No. 747,979, Dec. 6, 1976, abandoned.

[51] Int. Cl.² .................................................. B32B 31/00
[52] U.S. Cl. .................................... 156/276; 156/297; 156/301; 427/180; 427/203; 428/15; 428/22; 428/161; 428/323
[58] Field of Search ................ 53/22 R, 28; 156/272, 156/285, 298, 297, 276, 300, 301, 322; 427/407, 180, 203; 428/15, 22, 323, 331, 306, 161

[56] References Cited

U.S. PATENT DOCUMENTS

| | | | |
|---|---|---|---|
| 2,750,719 | 6/1956 | Wandelt | 53/22 |
| 2,931,495 | 4/1960 | Stratton | 156/285 |
| 3,143,454 | 8/1964 | Hannon | 156/301 |
| 3,244,572 | 4/1966 | Nicol | 156/301 X |
| 3,279,968 | 10/1966 | Wisotzky | 156/298 X |
| 3,289,386 | 12/1966 | Farmer | 53/28 |
| 3,335,540 | 8/1967 | Reil et al. | 53/28 |
| 3,342,306 | 9/1967 | Fabbri | 53/28 X |
| 3,389,033 | 6/1968 | Ullman | 156/272 X |
| 3,705,830 | 12/1972 | Gurgui et al. | 156/298 X |
| 3,749,621 | 7/1973 | Shoffner | 156/272 X |

Primary Examiner—Shrive P. Beck
Attorney, Agent, or Firm—Fisher, Gerhardt & Groh

[57] ABSTRACT

A landscape blanket to be used as ground cover in which particles such as crushed stone, marble chips and the like are arranged in a substantially single layer and are held together to form a blanket by sheets of transparent plastic material which conform to the shape of the particles and are bonded thereto without the use of adhesive. The plastic sheets are bonded to the particles by forcing them into contact with the particles while the plastic sheets are in a softened condition.

13 Claims, 13 Drawing Figures

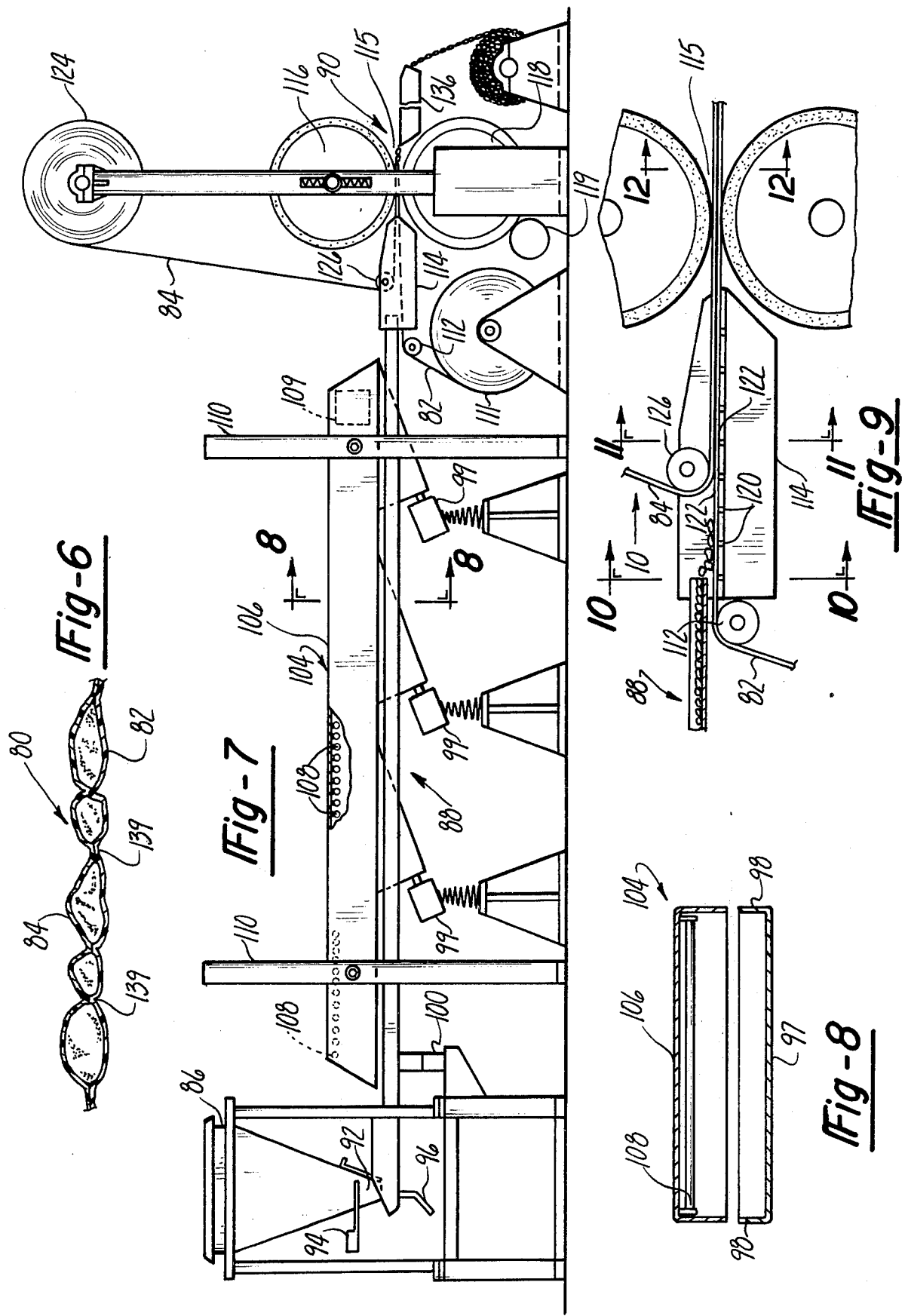

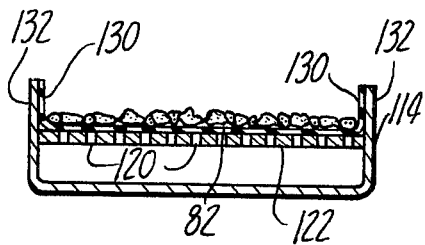
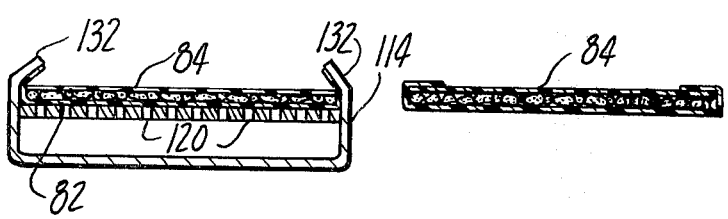
Fig-10  Fig-11  Fig-12
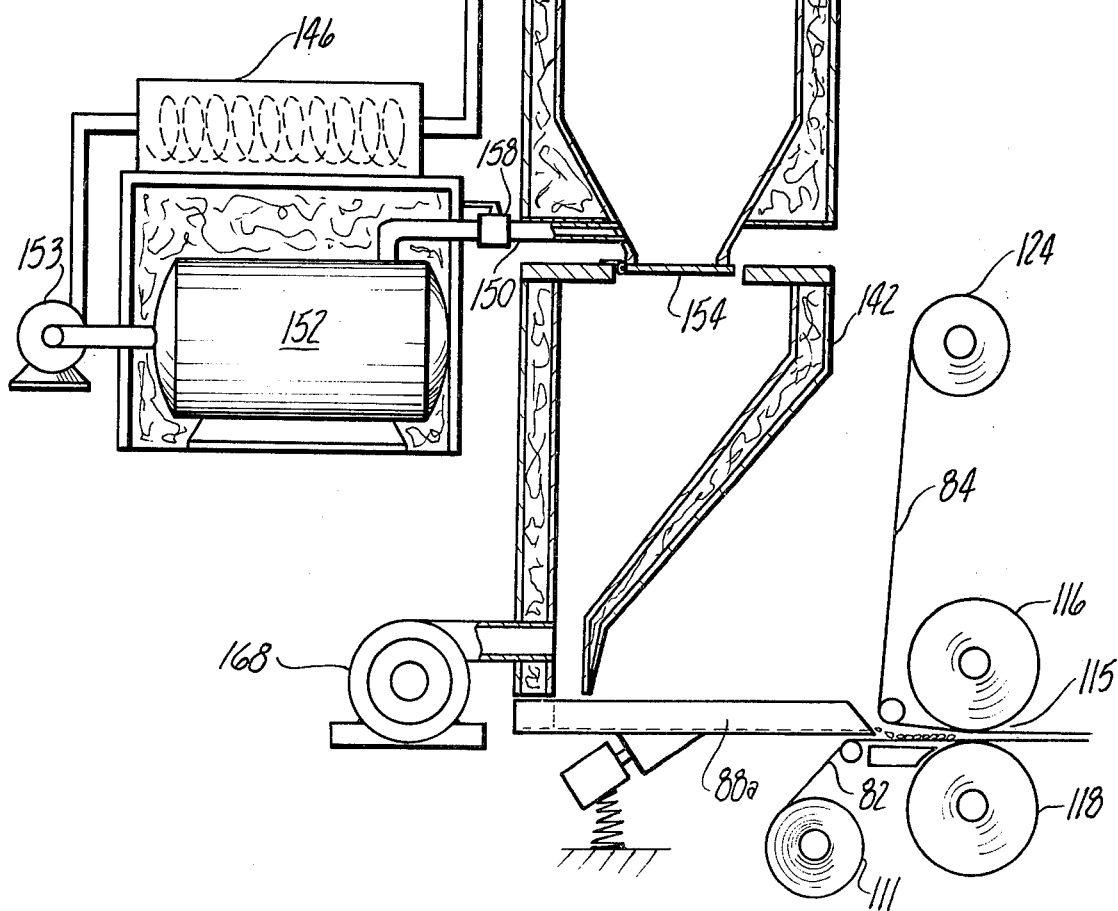
Fig-13

METHOD OF MAKING A LANDSCAPE BLANKET

This is a continuation-in-part application of my co-pending application Ser. No. 747,979 filed Dec. 6, 1976 now abandoned.

This invention relates to ground cover to be used in landscaping to enhance the appearance of and inhibit weed growth in planted areas.

In the art of landscaping, the ground area around flowers, shrubs and trees often is covered with a layer of material such as marble chips, crushed stone or other discrete particles of material. The material itself is decorative and in addition serves to inhibit weed growth. The material usually is deposited loosely directly onto the ground or onto a layer of plastic sheet or paper which is first laid on the ground. This is a laborious, time consuming operation. Also, after the installation of the material, the rough upper surface serves to accumulate dirt, leaves and trash which is extremely difficult to remove and sometimes requires complete removal of the material so that it can be cleaned and replaced. Also, sometimes the particles such as white marble chips, for example, become stained and discolored and require washing. Proper maintenance of the ground covered areas usually requires periodic removal, cleaning and replacement of the ground cover materials.

It would be very desirable to be able to employ a layer of discrete particles of material as a ground cover around shrubbery and other plants to enhance appearance and inhibit weed growth in which the particles might be easily and uniformly distributed on the ground surface, could be easily cleaned or if desired, easily and rapidly removed and replaced.

It also is an object of the invention to provide a blanket of particles of material of the type used for ground cover which can be packed and shipped at less expense than loosely packaged materials.

Another object of the invention is to provide a landscape blanket of particles of material and the method of making a blanket which not only is easily installed and easily removed but also may be very uniformly dispersed over the ground to insure complete cover without wasting any of the material by depositing particles in more than one layer.

Another object of the invention is to provide a landscape blanket in which particles of material are completely encapsulated between a pair of sheets of transparent plastic and in which the sheets conform to the irregular surface of the particles.

Still another object of the invention is to provide a method and apparatus for manufacturing a landscape blanket wherein particles are coated and heated uniformly so that the particles themselves act to heat the film of plastic so that the film can be pressed into conforming relationship with the particles.

A landscaping blanket of material and the method and apparatus of making the blanket is provided in which discrete particles of material such as marble chips or stones are disposed in a single layer in closely adjacent relationship to each other and in which the particles are bonded between layers of thin, completely transparent plastic film which encapsulates the particles and at least one layer of film conforms to the irregular shape of the particles to which the film is bonded so that the resultant blanket gives the appearance of a natural layer of loosely deposited material.

FIG. 6 is a view of another landscape blanket embodying the invention;

FIG. 7 is an elevation, partially diagramatic, of apparatus for manufacturing the landscape blanket shown in FIG. 6;

FIG. 8 is a cross-sectional view taken on line 8—8 in FIG. 7;

FIG. 9 is a cross-section of a portion of the structure seen in FIG. 7;

Figure 1:
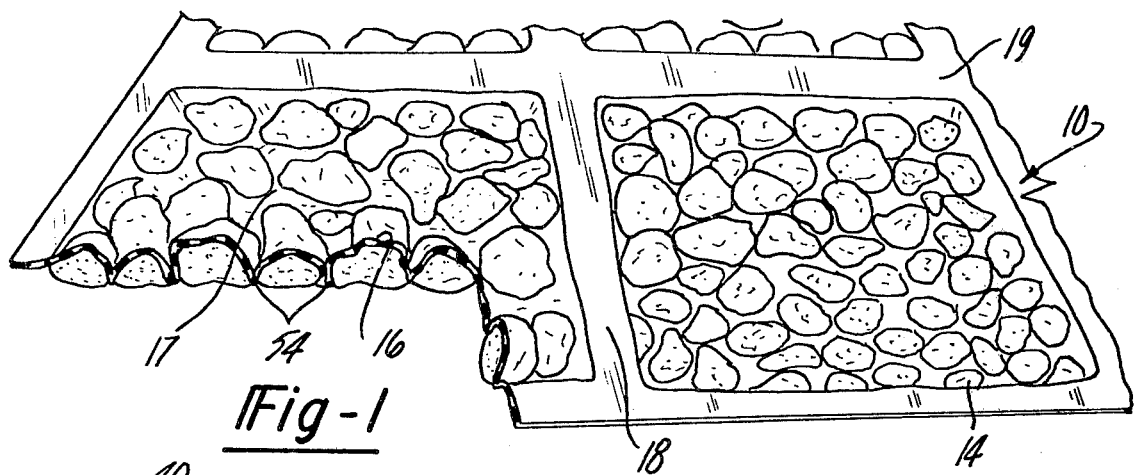
FIG. 1 is a view of a landscape blanket embodying the invention with portions of the blanket broken away and shown in cross section.

FIGS. 10, 11 and 12 are cross-sectional views taken on lines 10—10, 11—11 and 12—12, respectively in FIG. 9; and FIG. 13 is a diagrammatic, cross-sectional view of a modified form of apparatus for manufacturing the landscape blanket seen in FIG. 6.

Referring to the drawings a landscape blanket to be used for covering the ground and embodying the invention is designated generally at 10. The blanket 10 includes a layer of particles 14 such as pebbles, crushed stone or gravel, or chips of marble. The particles are arranged at random in substantially a single layer and in close proximity to each other. All of the particles 14 are bonded to a single sheet of the plastic film 16 such as Surlyn manufactured by E. I. DuPont. The film 16 is completely transparent and is disposed at one side of the layer of particles and is made to conform to a substantial portion of the surface of each of the particles 14. The film 16 is bonded to the particles without the use of adhesive so that it retains its transparency, making the particles completely and clearly visible through the film.

The finished landscape carpet 10 may be made up of particles arranged in groups or grids 17 each approximately eight inches square and separated from the adjacent grids by a lattice work of film strips 18 extending longitudinally and film strips 19 extending transversely of the blanket 10. The strips 18 and 19 are part of the layer of film 16 but are free of any particles of material. Such strips form borders for the particle groups 17 and permit folding of the landscape blanket for storage or transport. The strips 18 and 19 also make it possible to easily cut the blanket into smaller sizes for handling during installation as ground cover.

Figure 2:
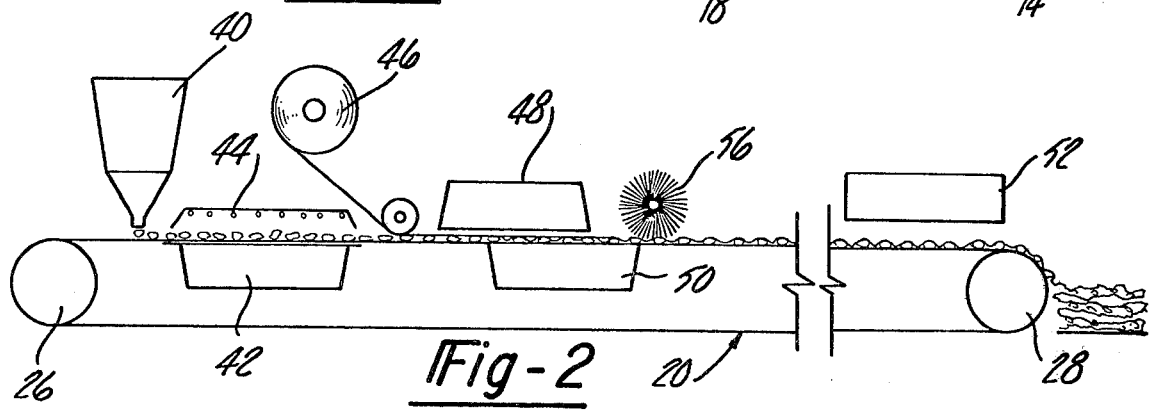
FIG. 2 is a schematic view of apparatus for manufacturing the landscape blanket shown in FIG. 1.
Figure 3:
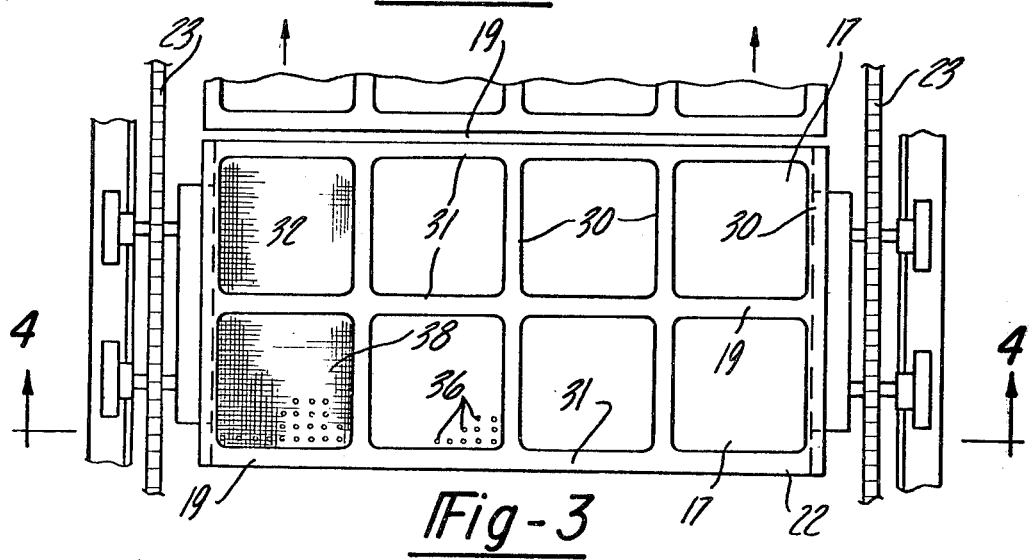
FIG. 3 is a top view of a portion of the apparatus seen in FIG. 2 but at an enlarged scale.
Figure 4:
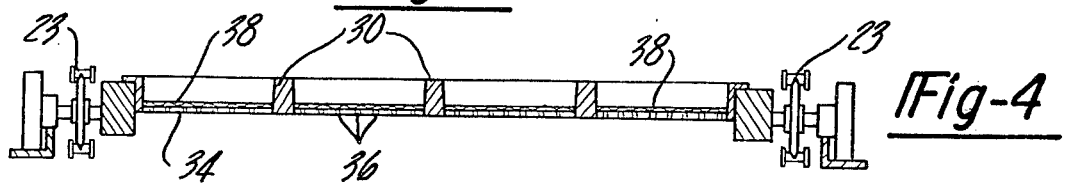
FIG. 4 is a cross-sectional view taken generally on line 4—4 in FIG. 3.

The method and apparatus by which the landscape blanket is manufactured will best be understood by referring to FIGS. 2, 3 and 4 in which a conveyor 20 is made up of rectangular trays 22 having a length equal to the width of the conveyor and a width approximately one half of the length of the tray. By way of example, the trays 22 can have dimensions of 36 by 18 inches. The trays are connected at opposite ends to conveyor chains 23 which are moved in any conventional manner so that they can be guided in the path of the conveyor and around sprockets 26 and 28 in a clockwise direction as viewed in FIG. 2. Each tray is formed with wall portions 30 and 31 which form square areas of equal size. The square areas can have dimensions to the order of approximately 8 by 8 inches. The bottom 34 of each of the trays is provided with a plurality of uniformly distributed holes 36. Disposed in the trays and on the bottom 34 is a member 38 of square wire mesh which preferably can be made of one sixteenth inch diameter wire.

During manufacture, particles 14 are delivered from a hopper 40 in predetermined quantities and measured by either weight or volume to each of the square areas in the trays 22. The trays 22 are subject to vibration at a station indicated at 42 to uniformly distribute particles in a substantially single layer with the particles in close adjacent relationship to each other and with their major axis arranged generally horizontally.

The particles 14 may be heated prior to delivery to the trays 22 or if desired may be heated at a heater station 44 after the particles are in the trays 22. The plastic film 16 is dispensed from a supply roll 46 at a speed conforming to conveyor speed and in a width conforming substantially to the width of the conveyor 20. The film is heated by heaters indicated at 48 to soften the film so that the film drapes or comes into close contact with the tops of the wall portions 30. Thereafter, vacuum from a vacuum box 50 is applied through the perforations 36 in the bottom of the trays 22 so that the softened film is drawn downwardly into engagement with the top and sides of the particles and against the mesh forming the bottom member 38. The trays travel through a cooling zone indicated at 52 and as the film and particles are cooled, the film resumes its original flexible state. Portions of the film that have been drawn down into engagement with the tops of the walls 30 and 31 form the strips 18 and 19 of the landscape blanket. Also, portions of the film which have been drawn down between the particles and into engagement with the mesh member 38 assume the pattern of the mesh wire. This tends to reinforce those portions of film between particles disposed in a plane completely at one side of the blanket 10 at locations such as those indicated at 54.

As the trays 22 reach the end of the conveyor 20 and travel over the sprocket 28, the blanket 10, which is in continuous form may be accordion folded along the transverse film strips 19 and accumulated in suitable quantities for further packaging or shipment.

After the film 16 has cooled, the portions of the film in contact with the particles are bonded to the particles and the use of separate adhesives is unnecessary. It has been found that the bonding between the particles and the film may be improved by insuring that the particles are clean. This is accomplished by typical cleaning operations such as washing or vacuuming. Also, the bonding between the particles and film may be improved by applying pressure to the top surface of the film while it is in its softened state and draped around the particles. It has been found also that bonding between the particles and a plastic film is greatly improved without the use of adhesive or the like with dispersion of water and particles of the same material that makes up the plastic film. This can be done in various ways such as by immersion or spraying and preferably before loading into the hopper 40.

The landscape blanket 10 which has been described can be used for ground cover in planting by placing it on the ground with the film portion on the top surface or on the bottom surface. When the blanket is used with the film forming the top surface, any accumulation of debris can be readily blown off or can be washed off with a stream of water from a garden hose. The film permits the encapsulated particles to be viewed completely without any interference and the appearance of the ground cover formed with the blanket 10 is the same as the appearance obtained with loosely distributed particles. When the film is disposed at the bottom of the blanket, the particle portions which have not been covered with film are exposed to view. This may make for a more natural appearance, particularly when used in indoor planting areas where accumulation of the debris and discoloration of particles does not present a problem.

Many plastic films give a glossy appearance and if desired, the gloss may be removed to give a more natural look to the particles in the blanket 10. This can be accomplished by brushing the plastic sheet 16 of the blanket 10 with a rotary brush 56 with then metal wire bristles. The brush 56 serves to scratch the top of the film 16 and forms minute ridges and grooves extending longitudinally of the plastic sheet. Such ridges interrupt light reflection to remove the glossy appearance of plastic sheeting without impairing its transparency and at the same time improves the bonding characteristics between the sheet and particles.

Figure 5:
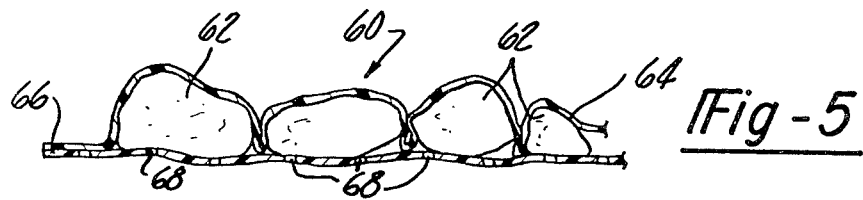
FIG. 5 is a cross-sectional view of a modified form of landscape blanket.

Another embodiment of the invention is illustrated in FIG. 5. In this instance a particle blanket 60 is formed with a layer of particles 62 which are encapsulated between a top film and a bottom film 66. The top film 64 is formed in the manner of the film 14 to embrace and bond to a substantial portion of the particles. The bottom film 66 preferably is formed with uniformly distributed openings 68 to permit the application of vacuum when the upper film layer 64 is in its softened state to draw it into contact with the particles 62. Also, the landscape blanket 60 may be formed on a continuous conveyor into a continuous blanket in which case it can be rolled rather than accordion folded for storage.

Both the blanket 10 and 60 repel the accumulation of dirt and debris because of the smooth surface formed by the plastic film and even if debris and dirt accumulate, it can be flushed off with water or blown off with air.

Because of the relatively uniform distribution of the particles, the fabricated landscaping blanket contains only one layer of chips so that greater coverage is obtained than when the particles are loosely distributed. By way of example, with marble chips, the present chip blanket requires approximately three and one half pounds of marble chips per square foot of cover whereas the recommended distribution of loose chips is about ten pounds of chips for each square foot of ground cover.

It has been found that weight of the landscape blanket 10 or 60 and therefore its cost for any given area of cover is substantially reduced by using particles whose major dimension is limited. By way of example, the blankets in which particles have been screened to have a major dimension under three-fourths of an inch, weighs as much as twenty-five percent less than blankets with particles larger than that. The reduction in weight results in a reduction in cost.

Another form of landscape blanket and method and apparatus for its manufacture is disclosed in FIG. 6 through 12.

In this instance a landscape blanket 80 is formed which has both a bottom sheet or film 82 and an upper or top sheet 84 but unlike the embodiment shown in FIG. 5, the bottom sheet 82 need not be perforated. The landscape blanket 80 also differs from the blanket 10 and 60 in that both the top and bottom sheets or films 82 and 84 are forced into tight engagement with the irregular top and bottom surfaces of the particles whereas in the prior embodiments differential pressure is employed to bring the film into adhering relationship with the surfaces. Although there is substantial conformity between the particle surface and film in the prior embodiment, the film does not necessarily follow minute crevices and variations in the particle surfaces but may bridge across minute areas to maintain portions slightly spaced from the particle surface. This tends to give a more glossy appearance to the product than in this embodiment of the invention. In the blanket 80, the tight relationship between the film and the particle surface including any minute variations, prevents the light from passing through the film and through an air space before reflecting from the particle surfaces. As a consequence the landscape blanket 80 does not require the use of brush 56 to form the ridges for interrupting light reflections.

The method and apparatus by which the landscape blanket 80 is manufactured can best be understood by referring to FIG. 7 in which the basic apparatus includes means for delivering particles to a temporary container such as a hopper 86, means for conveying the particles in the form of a conveyor 88 and a roll assembly 90 which forms the means for pressing the sheets of film 82 and 84 against a layer of particles.

More specifically, the hopper 86 can be fed in any conventional manner with a supply of particles in the form of marble chips or the like. While descending through the lower tapered portion 92 of the hopper, the particles may be coated with a dispersion of approximately 5% to 15% plastic solids in water which are dispersed by the metering pump 94 and any excess is drained through the drain system 96.

From the bottom of the hopper 86 the particles are dispersed over the width of the conveyor 88. The conveyor is in the form of an elongated trough having a bottom 97 with side walls 98. The conveyor 88 is the vibratory type in which a plurality of magnetic drives 99 vibrate the trough-shaped conveyor so that particles arranged thereon are advanced from the left to the right as viewed in FIG. 7. This insures that the particles are arranged in substantially a single layer. The density or the closeness of the particles to each other can be determined by changing the angle of inclination of the conveyor by an adjustment indicated at 100. Changing the angle of inclination or up-hill grade of the conveyor 88 only a slight amount is effective to compact the particles. For example, in a conveyor of approximately 15 feet an adjustment of one-fourth of an inch will tend to bring the particles more closely together than if they were being advanced on a fully horizontal conveyor.

As the particles are being advanced on the conveyor 88, a heater or oven assembly 104 is used to heat the particles to a temperature in the range of 220° to 240° F. The hood 106 of the oven 104 extends for substantially the full length and for the entire width of the conveyor and includes a plurality of infra red heat lamps 108. The lamps 108 are such that they operate to heat the particles with a rapid response to control signals requiring an increase or decrease in the temperature. A temperature sensing device 109 may be disposed at the discharge end of the conveyor to signal required temperature changes. The hood 106 also can be adjusted vertically on supports 110 to adjust the spacing between the lamps 108 and the particles on the conveyor 88 to further regulate heating.

At the end of the conveyor 88 the particles are delivered to the upper surface of the film 82 which is fed from a supply roll 111 over roller 112 and then horizontally over an airbox 114 or transport device to pass between a nip 115 formed by an upper roll 116 and a lower roll 118 in closely adjacent relationship to each other and forming the roll assembly 90. The lower roll 118 is power driven by a motor and speed reducer 119 and the upper roll 116 is driven by the lower roll 118.

The airbox 114 has a plurality of uniformly spaced perforations 120 in its upper wall surface 122. The interior of the box 114 is maintained at a low pressure, for example, to the order of 0.02 to 0.03 psi so that as the web of film 82 is advanced from the roll 111 over the upper surface 122, the air escaping from the openings 120 and acting against the underside of the film 82 tends to support both the film 82 and the particles thereon so that they can be advanced to the nip 115 with a minimum of friction.

The top sheet or film 84 is fed from a supply roll 124 downwardly around an idler roll 126 from which it passes generally horizontally above the layer of particles on the bottom film 82 and between the nip 115 formed by the upper and lower roll 116 and 118.

The surface of the rolls 116 and 118 are covered with a layer of soft rubber which has a relatively high temperature resistance. The thickness of the rubber, by way of example, is approximately 1 inch for a roll having a 16 inch diameter.

As the sheet of film 82 and 84 with the layer of particles sandwiched therebetween passes between the nip 115 of the powered roll 116 and the follower roll 118, the heated particles soften the films 82 and 84 and rolls 116 and 118 apply pressure to opposite sides of the composite layer of material. As a result heat softened film is pressed into tight contact with opposite sides of the heated particles.

Although the pressure applied by the rolls 116 and 118 is relatively low, that is less than 150 psi, the rolls tend to press the films 82 and 84 into tight, very accurately conforming relationship with the opposite surfaces of the particles. Also, the marginal edges of the top and bottom films are brought into tight engagement with each other to completely encapsulate the particles. For this purpose the lower film 82 has its marginal edge 130 folded upwardly as seen in FIG. 10 by sidewalls 132 projecting above the wall 122. The edges 130 are progressively folded inwardly and over the edges of the upper film 84 as film webs 82 and 84 are advanced toward the nip 115 as seen in FIGS. 10, 11 and 12. Pressure of the rolls 116 and 118 seals the edges 130 of the lower film web 82 to the edges of the upper film web 84.

After the landscape blanket 80 made up of the particles and the upper and lower films 82 and 84 leaves the nip 115 formed by the upper and lower rolls 116 and 118, it is conveyed on a power conveyor 136 or the like to a take-off roll 138 which serves to wind the finished product into a roll for shipment. The conveyor 136 may be of sufficient length to allow cooling of the finished product or other conventional cooling provisions may be made.

The rolls 116 and 118 force the film to penetrate into small cavities and crevices in the surface of the particles to bring the film into intimate contact with the surface of the particles. This reduces the possibility of moisture accumulation or air pockets between the film and the particle surfaces. Also this gives a natural satin finish appearance without requiring brushing to avoid a glossy finish. Moreover, the pressure applied by the rolls improves adhesion of the films 82 and 84 to the particles. Also the pressure applied by the rolls tends to automatically align the particles with their two major dimension disposed in a substantially horizontal plane thereby resulting in a substantial single layer of particles affording maximum coverage for a given quantity of particles. In the intersticies between particles, the two layers of film 82 and 84 are brought into tight bonded engagement with each other as indicated at 139 in FIG. 6 thereby resulting in a stronger blanket.

When the surfaces of the rolls 116 and 118 are covered with a layer of soft rubber which are approximately equal in resiliency, the films 82 and 84 are pressed substantially equally towards each other so that both the upper and the bottom surfaces have about the same irregular finish. If desired however, one of the rolls can be covered with a hard surface in which case the surface in contact with the hard roll will have a substantially flat finish and the opposite surface will be irregular.

It is highly desirable that the particles to be encapsulated between the films 82 and 84 be heated to a relatively uniform temperature so that the film can be uniformly heated when it comes in contact with the particles. Also it is very desirable that the particles be uniformly coated with a solution of water and plastic particles to enhance adhesion between the film and particles. For this purpose another apparatus is disclosed in FIG. 13 which may be substituted for the hopper arrangement 86 used to coat particles and for the oven 104 seen in FIG. 6. Also the arrangement makes it possible to use a conveyor 88a much shorter than that in FIG. 6.

An apparatus for washing, coating and heating the particles is designated generally at 140 and includes a hopper 142 for receiving heated particles and delivering them to the conveyor 88a. A pressure tank 144 is positioned directly above the hopper 142 to receive the aqueous coating dispersion which is delivered from a heater 146 through line 148 to the upper end of the pressure tank 144. Excess coating dispersion is drained from the bottom of the pressure tank 144 through a line 150 to a storage tank 152 which delivers solution back through the heater 146 by means of a pump 153 which, by way of example, circulates the dispersion at a pressure of approximately 15 psi and at a rate to the order of 80 gallons per minute.

With the bottom of tank 144 closed by a gate 154, a predetermined volume of particles are loaded into the pressure tank. The volume can be selected to operate the remainder of the blanket production line for some predetermined time. A pressure cover 156 is used to close the upper end of the tank 144. The pump 153 is then used to circulate a watered dispersion of plastic and water from storage tank 152 through heater 146 and through line 148 into the upper end of the tank 144. The coating is delivered over the complete top surface of the particles and passes through the voids between the particles as it drops from the top the pressure tank 144 to the outlet at the bottom of the tank and to the line 150. During the passage of the dispersion past the particles, the water of the dispersion washes the particles and at the same time coats them with the heated dispersion so that the particles themselves are heated. The pressure in the system is permitted to build up to approximately 15 psi at which pressure the dispersion temperature will reach approximately 250° F. so that all of the particles are heated relatively uniformly with the maximum temperature being the same as that of the solution.

After the dispersion has been circulated a sufficient number of cycles to heat the particles, the action of the heater and of the pump is stopped and the excess solution is allowed to drain back into the tank 152 through the line 150. Thereafter valves 158 and 160 are closed to maintain the pressure and temperature of the dispersion in readiness for the next batch of particles.

Pressure in the tank 144 is relieved by opening a valve 162 which serves to flash evaporate any moisture on the particles. Thereafter the cover 156 and the bottom gate 154 can be opened to permit the washed, coated and heated particles to drop into the hopper 142. The gate 154 is then closed for the next batch of particles to be heated, cleaned and coated in the pressure tank 142.

It will be noted that although the particles are heated and coated in a batch operation that the hopper 142 is sized and is insulated to maintain the temperature of the particles during their delivery to the conveyor 88a so that the remainder of the process can be substantially continuous.

The remainder of the apparatus and the process is carried on substantially the same as in the prior embodiment. The conveyor 88a is substantially shorter than the conveyor 88 and no additional heating is required since the particles are heated to their maximum temperature determined by the temperature of the solution in the pressure tank 144. The particles are maintained at the desired temperature in insulated hopper 142 until distributed at a controlled rate on the vibrating conveyor 88a. As the particles leave the hopper they may be dried additionally by an air blower 168. The length of the conveyor is only long enough to insure that the particles are arranged in a single random layer prior to their delivery to the transport mechanism 114 and on the film 82. The delivery of film 82 and 84 and particles to the nip 115 and the action of the rolls 116 and 118 is the same as in the arrangement shown in FIGS. 7 and 9.

An article of manufacture namely a landscape blanket has been provided together with its method and apparatus for manufacture. The product itself is such that particles of material are completely encapsulated between layers of thin plastic film so that one or both surfaces may be provided with an irregular finish with the particles very uniformly distributed to give a pleasant appearance. The method and apparatus by which the blanket is manufactured relies on applying pressure to opposite sides of an arrangement of particles and two sheets of plastic film to fully encapsulate the particles between the film. At least one of the rolls is provided with a soft surface to accommodate the irregular surface of particles. Prior to the application of mechanical pressure to the film at opposite sides of the particles, the particles themselves are coated with a dispersion of water and the same type of plastic as the film and are heated to a substantially uniform temperature. In one embodiment of the invention the particles are heated radiantly and serve to heat the film by conduction from the particles to the film so that the latter is softened. In another embodiment of the invention the particles are coated and heated at the same time in a tank under pressure so that subsequently, the heated particles serve to heat the film.

The embodiments of the invention in which an exclusive property or privilege is claimed are defined as follows:

1. The method of making a landscape blanket having a layer of particles encapsulated between two sheets of flexible resin material, comprising the steps of; coating a plurality of stone particles of irregular and non-symmetrical shape and size with an aqueous dispersion containing particles of the same material forming said resin sheets, spreading the coated stone particles on a surface of a single random layer with adjacent stone particles contacting each other and covering substantially all of a given area to form a continuous irregular surface, heating said stone particles to a temperature sufficient to heat the resin film so that the film may be pressed into conforming relationship with said stone particles, conveying said particles in a given path, positioning said resin sheets proximate to each side of said layer of coated stone particles as said layer leaves the end of said path, applying a resilient pressure member to each of said resin sheets to press said resin sheets toward each other at the opposite sides of said layer of stone particles and into contacting and adhering relationship with the irregular surfaces of said heated stone particles at the opposite sides thereof, said aqueous dispersion forming a bond between said resin sheets and said particles, and then cooling said blanket of stone particles and resin sheets after the blanket leaves the pressure members.

2. The method of claim 1 wherein said dispersion of resin particles is in hot water and said stone particles are heated during said coating with said dispersion.

3. The methods of claim 2 wherein the heating of said particles in a solution is conducted under pressure.

4. The method of claim 1 wherein the layer of particles is formed on a flat surface and further comprising heating said particles when the latter are on said surface and subsequently delivering said layer of particles between said pair of sheets.

5. The method of claim 1 and further comprising folding the edge of one of said plastic sheets of material around the edge of said layer of particles and into engagement with the other sheet of plastic material prior to delivery of said particles and sheets of plastic material between said pair of pressure elements.

6. The method of claim 1 and further comprising the steps of drying the water of said dispersion from said stone particles.

7. The method of claim 1 wherein resin particles in said dispersion make up to 15% of the volume of said dispersion.

8. The method of claim 1 wherein said stone particles are washed prior to said spreading of said stone particles in said layer.

9. The method of claim 8 wherein said stone particles are washed by the water of said dispersion.

10. The method of claim 1 wherein said heating raises the temperature of said stone particles above the softening temperature of said resin particles in said dispersion.

11. The method of claim 1 wherein the step of spreading said stone particles is conducted by vibrating said stone particles during conveying of said stone particles in said given path.

12. The method of claim 1 wherein said resilient pressure members are of equal resiliency and are applied simultaneously.

13. The method of claim 1 wherein said resilient pressure members are cylindrical rolls and are applied simultaneously to said sheets of resin material during movement in a second path following movement of said stone particles in said first mentioned path.

* * * * *

UNITED STATES PATENT AND TRADEMARK OFFICE
CERTIFICATE OF CORRECTION

PATENT NO. : 4,154,637
DATED : May 15, 1979
INVENTOR(S) : Walter Kasten

It is certified that error appears in the above—identified patent and that said Letters Patent are hereby corrected as shown below:

Column 9, line 8, "of" should read --in-- line 31, "methods" should read --method--

Signed and Sealed this

Fifth Day of February 1980

[SEAL]

Attest:

SIDNEY A. DIAMOND

Attesting Officer           Commissioner of Patents and Trademarks